United States Patent

Thier et al.

[11] Patent Number: 6,044,637
[45] Date of Patent: Apr. 4, 2000

[54] BEDKNIFE ADJUSTMENT LINKAGE

[75] Inventors: Richard David Thier, Juneau; Phillip Orland Swenson, Beaver Dam; Ronald Lee Reichen, Horicon, all of Wis.; Donald Emil Niosi, Prior Lake, Minn.

[73] Assignee: Deere & Company, Moline, Ill.

[21] Appl. No.: 09/015,920

[22] Filed: Jan. 30, 1998

[51] Int. Cl.⁷ .................................................. A01D 34/53
[52] U.S. Cl. .............................................. 56/249; 56/294
[58] Field of Search .................................. 56/249, 294, 7

[56] References Cited

U.S. PATENT DOCUMENTS

| | | |
|---|---|---|
| 1,802,304 | 4/1931 | Anderson . |
| 1,872,119 | 8/1932 | Carlson . |
| 2,084,946 | 6/1937 | Couture . |
| 2,197,295 | 4/1940 | Cambridge . |
| 2,335,054 | 11/1943 | Godwin ........................................ 56/26 |
| 2,624,168 | 1/1953 | Clemson ..................................... 56/249 |
| 4,335,569 | 6/1982 | Keeney et al. . |
| 4,637,204 | 1/1987 | Benson et al. . |
| 5,291,724 | 3/1994 | Cotton . |

FOREIGN PATENT DOCUMENTS

| | | |
|---|---|---|
| 0106452 | 4/1984 | European Pat. Off. . |
| 1482913 | 10/1969 | Germany . |
| 2212884 | 9/1973 | Germany . |
| 516932 | 1/1940 | United Kingdom . |
| 2137063 | 10/1984 | United Kingdom . |
| WO 91 03927 | 4/1991 | WIPO . |

OTHER PUBLICATIONS

Deere & Company, 220A Walk–Behind Greensmower Operator's Manual, pp. 14–17 and 48–57, date–unknown, published in U.S.A.

Jacobsen, Division of Textron Inc., Greens Mower Operator's Manual, pp. 1–27, see particularly p. 11, dated 1989, published in U.S.A.

The Toro Company, 8 & 11 Blade Cutting Units Operator's Manual, pp. 1–8, see particularly p. 3, dated 1995.

*Primary Examiner*—H. Shackelford

[57] ABSTRACT

A bedknife adjustment device includes a double legged bracket which supports a threaded rod, and a compression spring abuts one leg of the bracket for removing play from the linkage at both ends of the threaded rod. A nut positioned between the legs of the bracket can be tightened on the threaded rod for further compressing the compression spring to thereby remove the force of the spring from the linkage to allow the linkage to be easily swung out to a service position.

21 Claims, 3 Drawing Sheets

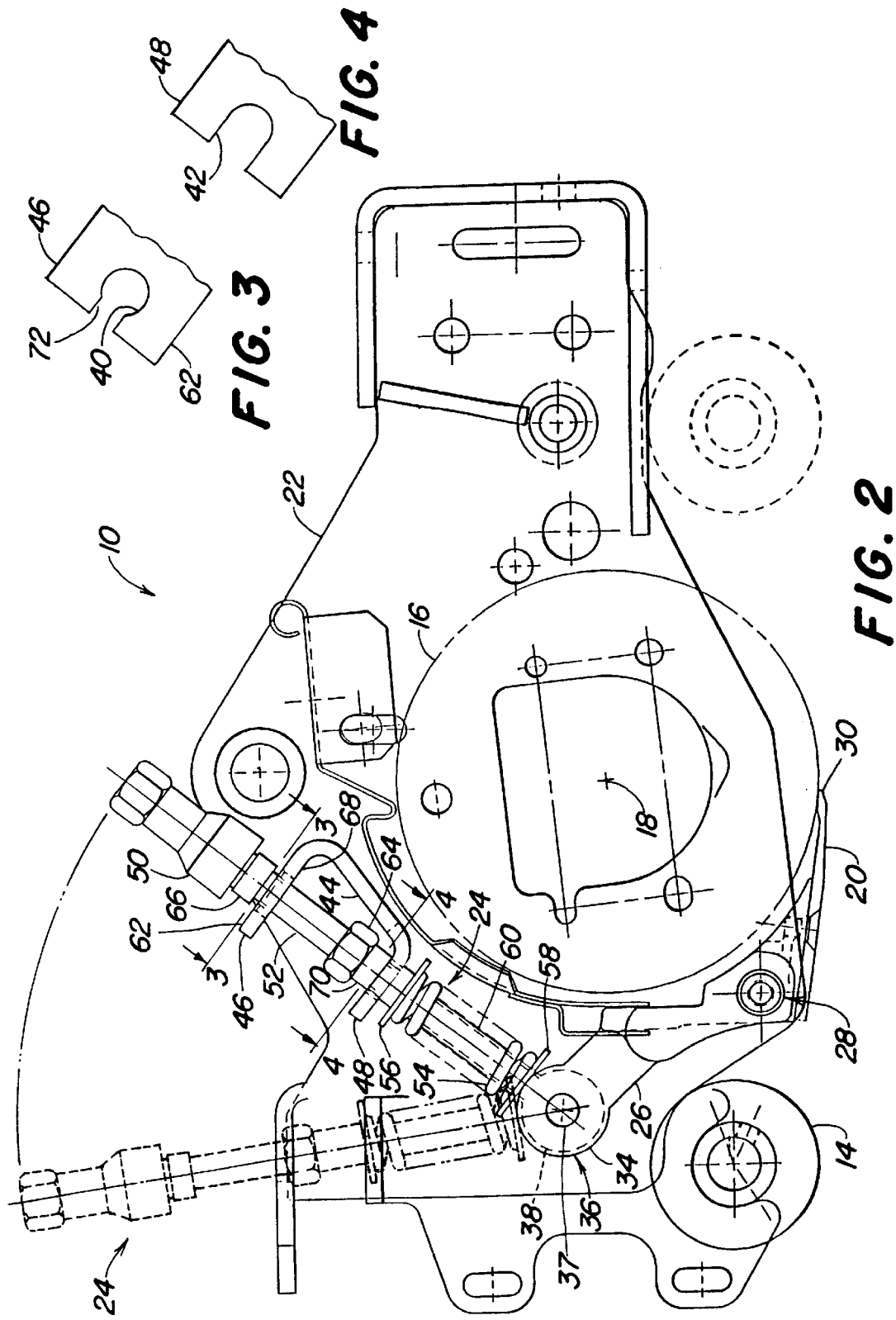

BEDKNIFE ADJUSTMENT LINKAGE

This invention relates to linkages that adjust the position of a reel mower cutting unit's bedknife with respect to the blades of the reel.

Conventional reel mower cutting units are utilized on golf courses and other turf areas that require grass to be cut very accurately. The cutting units are typically rolled across the surface of the ground by a powered vehicle. These cutting units include a generally cylindrical reel that has a plurality of blades which rotate in close proximity to a stationary bedknife fixed with the frame of the cutting unit. Grass is cut by a shearing action between the bedknife and the rotating blades of the reel. The height at which grass is cut can be adjusted by altering the height at which the cutting unit frame is positioned above the ground surface. The bedknife is routinely serviced and adjusted to be in proper position with respect to the reel blades such that the grass is cut effectively. Conventional cutting units provide a linkage that allows an operator to adjust the position of the bedknife with respect to the reel blades.

A first type of bedknife adjustment mechanism includes a threaded rod that has a lower end coupled with the bedknife. The rod is supported by a bracket fixed with the cutting unit frame. A nut is threaded onto the rod and is positioned above and in abutment with the bracket. The nut can be tightened or loosened to shift up or down along the rod. The rod is positioned within the coils of a compression spring which biases the rod downwardly for maintaining the nut firmly in abutment against the bracket. The rod shifts up or down with respect to the bracket and cutting unit frame as the nut is tuned by the operator. Shifting of the rod causes the bedknife to shift up or down, which adjusts the position of the bedknife with respect to the reel blades. The spring, nut and bracket hold the rod and bedknife in the particular selected position. The spring also serves to take any slack or play out of the linkage that may exist in the connection between the rod and the bedknife, or between the nut, rod and bracket. Slack would allow the bedknife to shift during operation, which could negatively affect cut quality and could cause damage to the reel blades or bedknife if the bedknife shifted upwardly into the reel blades due to this slack. When the bedknife on this type of cutting unit strikes an obstruction the linkage mechanism may allow the bedknife to shift upwardly against the compressive force of the spring as the bedknife strikes the obstruction. When this occurs the bedknife may actually strike one of the rotating reel blades, which can cause undesirable damage or wear to the blade or bedknife.

Another type of bedknife adjustment linkage also includes a threaded rod that is coupled with the bedknife for altering the position of the bedknife. The rod is positioned within an opening in a bracket, and a pair of jam nuts are threaded onto the rod on either side of the bracket. These jam nuts can be adjusted to alter the position of the rod and thereby alter the position of the bedknife. Adjustments are made by setting the position of the rod by manipulating the nut on top of the bracket so that the bedknife is in the proper position, and then tightening the lower nut upwardly against the underside of the bracket. Tightening of the lower nut against the underside of the bracket can sometimes cause the bedknife to shift slightly from the position set by the upper nut, and can therefore undesirably shift the bedknife slightly from the desired position. Adjustment of the bedknife by the use of jam nuts can be a delicate and time consuming process. This type of adjustment linkage also can include a compression spring that will take slack out of the connection between the threaded rod and bedknife. Many such units do not provide compression springs that take up slack that may develop between the nuts, rod and bracket. Since the jam nuts positively set the position of the rod, the bedknife is generally blocked from shifting upwardly into or against the reel blades when the bedknife strikes an obstruction. This type of adjustment mechanism can be relatively difficult to assemble since the compression spring must be somehow held in a compressed fashion while the linkage is assembled.

In view of these prior art mechanisms, it would be desirable to provide a bedknife adjustment linkage mechanism that is relatively easy to assemble and disassemble. It would be desirable to provide an adjustment mechanism that allows the position of the bedknife to be quickly and easily adjusted to a desired position with respect to the reel blades. It would be desirable for such a linkage to be held firmly in the selected position once the operator adjusts the linkage to the proper bedknife position. It would also be desirable to provide such a linkage with a mechanism for eliminating slack in the linkage such that the bedknife will not shift due to excessive slack or play. It would be desirable for such a linkage to take up slack at both ends of the linkage's threaded rod: at the upper end of the rod where the rod is operatively connected with the frame, and at the lower end of the rod where the rod is operatively connected with the bedknife.

SUMMARY OF THE INVENTION

The preferred embodiment of the present invention provides a bedknife adjustment linkage that allows an operator to alter the position of the bedknife with respect to the reel blades. The bedknife is fixed with a bedknife support member pivotally mounted to the cutting unit frame. A threaded rod or eye-bolt member is pivotally coupled with the support member. The rod is received in slots formed in each leg of a double legged bracket fixed with the frame of the cutting unit. An adjustment member is threaded on the top end portion of the rod and abuts the top surface of the first leg of the bracket. The operator can rotate the adjustment member which shifts the rod up or down, which in turn causes the support member to swing about its pivotal connection to the frame. This in turn causes the front cutting edge of the bedknife to shift up or down with respect to the reel blades. The reel to bedknife adjustments are made in this manner by rotating the adjustment member.

When the bedknife requires service or replacement the linkage according to the present invention can be swung to a service position that provides an operator with access to the bedknife. The operator first rotates a nut positioned between the legs of the bracket downwardly along the rod until the nut abuts against a sleeve. As the operator continues to tighten the nut downwardly, the sleeve presses a first washer downwardly against the compression spring. As the nut shifts further downwardly the spring becomes further compressed, which causes the spring force to be removed from the bracket. This establishes clearance between the washer and the underside of the bracket's second leg. In this configuration the compression spring no longer pulls the threaded rod and adjustment member downwardly with respect to the bracket. The operator then rotates the adjustment member so that it shifts upwardly along the rod until a spacer or shoulder portion of the adjustment member is completely above the bracket's first leg. The rod can then be swung outwardly away from the bracket so that the operator can service or replace the bedknife.

The present invention includes slots formed in the first and second legs of the bracket. The slot in the first leg includes a narrowed portion that is not large enough to allow a spacer or shoulder portion of the adjustment member to shift out from the central opening of the slot. The operator must loosen the adjustment member until the shoulder portion is above the first leg and out of alignment with the slot. The rod is sized sufficiently small to pass through the narrowed portion of the slot.

During operation in the normal mowing mode the nut is positioned in abutment with the shoulder fixed to the adjustment member. In this position the nut helps secure the adjustment member in the selected position. The shoulder serves to space the nut from the first leg of the bracket. Therefore, when the nut is tightened upwardly against the shoulder the nut will not abut the first leg, which might cause the rod to shift and displace the bedknife from the desired position.

BRIEF DESCRIPTION OF THE DRAWINGS

FIG. 2 is a side view of the bedknife adjustment linkage according to the present invention, showing the linkage in solid lines adjusted to a released mode, and showing in phantom lines the linkage swung out to a disengaged or service position.

FIG. 3 is a view of the first leg of the double legged bracket member and the first slot as viewed along lines 3—3 in FIG. 2.

FIG. 4 is a view of the second leg of the double legged bracket member and the second slot as viewed along lines 4—4 in FIG. 2.

DETAILED DESCRIPTION OF THE PREFERRED EMBODIMENT

Figure 1:
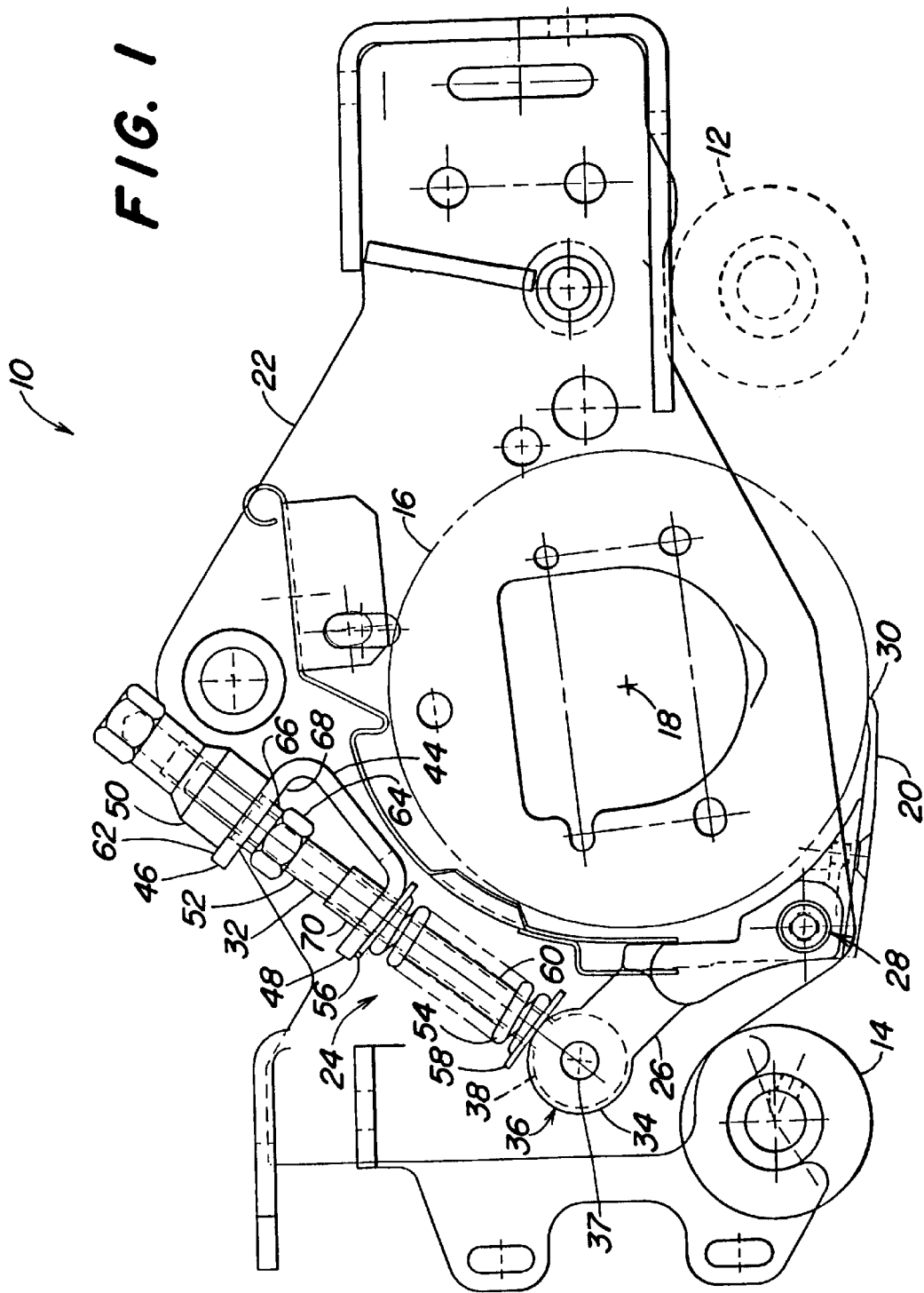
FIG. 1 is side view of a reel mower cutting unit having the bedknife adjustment linkage according to the present invention shown in the normal mowing mode.

Referring now to FIGS. 1–5, there is shown the preferred embodiment of the present invention. A reel mower cutting unit 10 is typically mounted to a mowing vehicle by way of push arms. As the vehicle is driven across the ground the push arms connected between the vehicle and the cutting units 10 propel the cutting units 10 along the ground with the vehicle in conventional fashion. The cutting units 10 include front and rear rollers 12 and 14 that roll in contact with the ground and support the cutting unit 10 during operation. The cutting unit 10 includes a generally cylindrical reel 16 having a plurality of blades that rotate about the reel's laterally extending central axis 18. As the blades 16 rotate they pass in close proximity to a bedknife 20 that is operatively fixed with the cutting unit frame 22. The blades 16 and bedknife 20 interact to cut grass with a shearing action in conventional fashion as the cutting unit 10 is propelled forwardly.

A linkage 24 is provided by the present invention for adjusting the position of the bedknife 20 with respect to the reel blades 16 so that the shearing action can be fine tuned for providing a high quality cut. The bedknife 20 is coupled with a bedknife support member 26 pivotally mounted with the cutting unit frame 22 by way of a pivotal connection mechanism or pivot pin member 28. The bedknife support 26 can be adjusted to pivot about the pivotal connection mechanism 28 to allow the forward cutting edge 30 of the bedknife 20 to swing generally vertically toward or away from the reel blades 16 to thereby adjust the shearing action between the bedknife 20 and blades 16. A threaded rod or eye-bolt 32 is pivotally coupled with the rearward end portion 34 of the support member 26 by way of a connection device 36. The connection device 36 includes a headed pin member 37 that extends horizontally through the eye 38 of the eye-bolt 32 and pivotally couples the eye-bolt 32 to the support member 26. The head on one end of the headed pin member 37 and a cotter pin received by the other end of the headed pin 37 block the headed pin 37 from shifting out of the eye 38 of the eye-bolt 32.

The eye-bolt or threaded rod 32 is positioned within slots 40 and 42 defined in a double legged bracket 44. The two legs 46 and 48 of the bracket 44 define first and second brace members 46 and 48 in which the slots 40 and 42 are formed, as shown in FIGS. 3 and 4. An adjustment member 50 having internal threads engages the threads on the upper end portion 52 of the rod 32. As an operator rotates the adjustment member 50 on the threads of the rod 32, the rod 32 shifts with respect to the bracket 44 along the rod's central axis. As the rod 32 shifts along its axis in this manner the support member 26 swings about the pivotal connection 28, causing the cutting edge of the bedknife 20 to swing up or down in relation to the reel blades 16. It is in this way that the bedknife 20 is adjusted.

A compression spring 54 is positioned between first and second washers 56 and 58. The rod 32 is positioned within the coils of the spring 54. The compression spring 54 is compressed between and applies a force to the bracket 44 and support member 26 via the washers 56 and 58. The compression spring 54 serves to take the play or slack out of the linkage 24 at both the upper 52 and lower 60 ends of the rod 32. At the lower end 60 of the rod 32, the compression spring 54 presses downwardly against the second washer 58 which presses downwardly against portions of the support member 26. The compression spring 54 also effectively urges the rod 32 upwardly with respect to the support member 26 at this location. By doing so, the compression spring 54 will take any play or gaps out of the connection between the rod 32 and the support member 26, and therefore the bedknife 20 is held rigidly in the position selected. At the top end portion 52 of the rod 32, the compression spring 54 presses upwardly against the first washer 56, which presses upwardly against the second leg 48 of the bracket 44. The compression spring 54 also effectively urges the rod 32 downwardly with respect to the bracket 44 at this location. This causes the adjustment member 50 to be pressed firmly downwardly against the upper surface 62 of the first leg 46 of the bracket 44. In this way the compression spring 54 eliminates any slack or play from between the rod 32, adjustment member 50 and bracket 44. The elimination of slack at this location helps to firmly hold the bedknife 20 in the position selected so that the bedknife 20 will not wobble in place or shift undesirably during mowing operations. The present invention therefore eliminates slack at both ends of the threaded rod 32.

The compression spring 54 of the present invention presses the rear portion 34 of the support member 26 downwardly, which urges the forward cutting edge 30 of the bedknife 20 upwardly toward the reel 16. The abutment of the adjustment member 50 against the top surface 62 of the first leg 46 of the bracket 44 effectively blocks the bedknife 20 from shifting upwardly into the reel blades 16 under the force imparted by the compression spring 54. When the bedknife 20 strikes an obstruction during mowing operations the bedknife 20 is generally blocked from shifting upwardly into the reel blades 16 by the abutment of the adjustment member 50 against the first leg 46 of the bracket 44.

A hex nut 64 is threaded onto the rod 32 in position between the first and second legs 46 and 48 of the bracket 44. During mowing operations the nut 64 is positioned against a spacer or shoulder portion 66 of the adjustment member 50 to thereby help secure the adjustment member 50 in the selected position. The shoulder 66 effectively spaces the nut 64 from the underside 68 of the first leg 46 of the bracket 44. Therefore, when the nut 64 is tightened up against the shoulder 66 before beginning normal mowing operation the nut 64 will not contact or press upwardly on the first leg 46 of the bracket 44 which might cause the rod 32 to shift. Since the nut 64 does not contact the first leg 46 of the bracket 44, the nut 64 tends not to alter the position of the bedknife 20 when the nut 64 is tightened upwardly to lock the adjustment member 50 in place.

When maintenance operations must be performed on the bedknife 20 or other portions of the cutting unit 10, the bedknife adjustment linkage 24 can be swung counterclockwise as viewed in FIG. 2 about the axis defined by the connection device 36. To do this the operator tightens the nut 64 downwardly along the rod 32 until the nut 64 abuts against a sleeve 70 that abuts the first washer 56. The operator continues to rotate the nut 64 so that the nut 64 continues to shift downwardly along the rod 32, and the nut 64 will press the sleeve 70 and first washer 56 downwardly which will press the spring 54 downwardly to the position shown in solid lines in FIG. 2. With the spring 54 compressed in this manner, clearance is provided between the first washer 56 and the second leg 48 of the bracket 44 such that the spring 54 no longer pulls the rod 32 downwardly with respect to the bracket 44, and all friction is removed from between the washer 56 and second leg 48 of the bracket 44. The operator will then rotate the adjustment mechanism 50 such that it shifts upwardly along the rod 32 to the position shown in solid lines in FIG. 2. In this position the shoulder portion 66 of the adjustment member 50 has been shifted generally above the first leg 46 of the bracket 44 and out of alignment with the narrowed portion 72 of the slot 40 in the first leg 46 of the bracket 44. The portion of the rod 32 aligned with the narrowed portion 72 of the slot 40 is more narrow than the shoulder 68 and can pass easily through the narrowed portion 72 of the slot 40. The sleeve 70 is narrow enough to pass through the slot 40 in the second leg 48 of the bracket 44. Therefore when the linkage 24 is adjusted to the configuration shown in solid lines in FIG. 2 the operator can then pivot the rod 32 counterclockwise through the slots 40 and 42 and away from the bracket 44 to the position shown in phantom in FIG. 2. With the linkage in the position shown in phantom in FIG. 2, the bedknife 20 will have pivoted clockwise about the pivotal connection mechanism 28 and can then be easily removed from the support member 26 for service or replacement. Also, clearance is provided so that other maintenance operations can more easily be performed.

Figure 5:
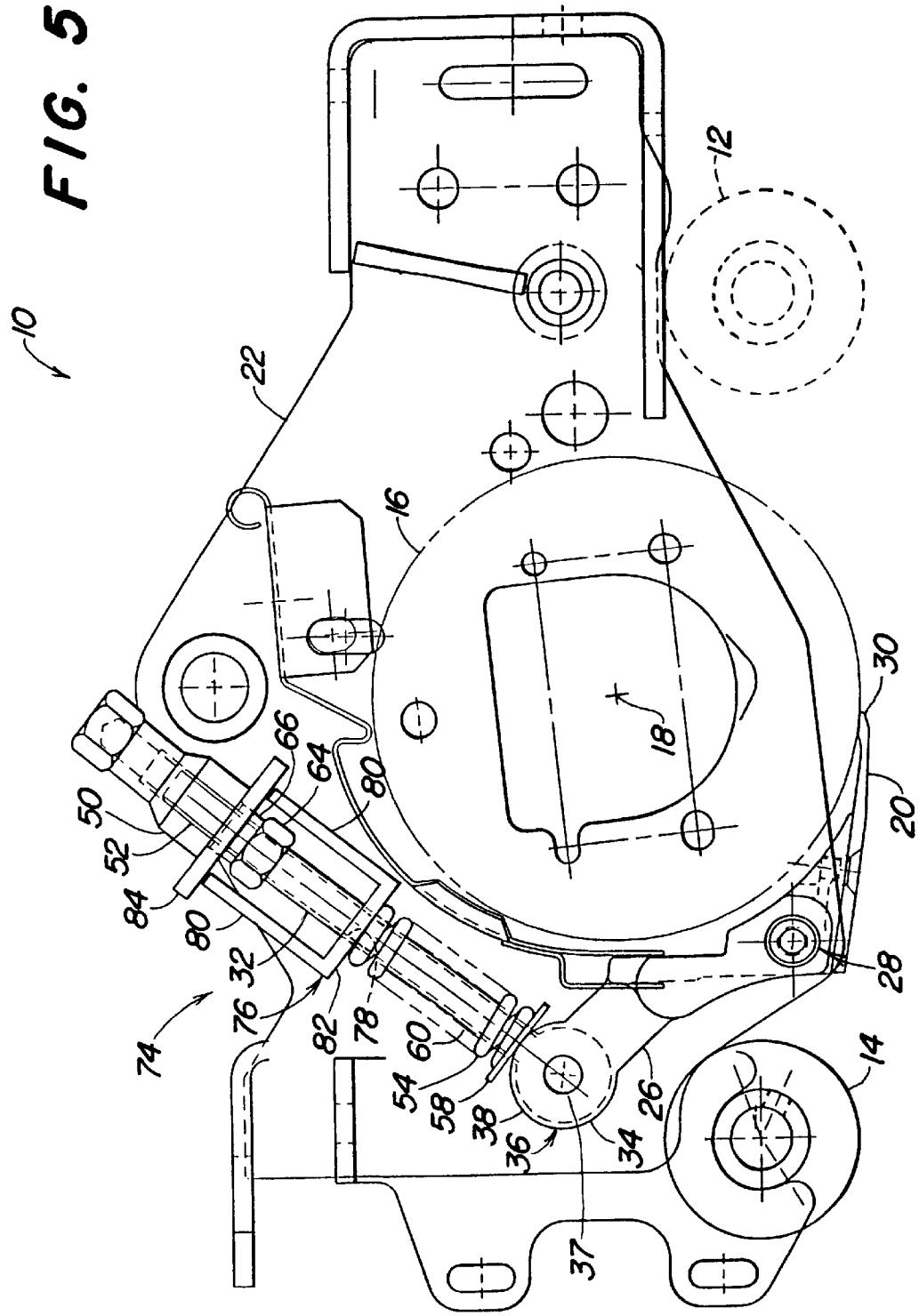
FIG. 5 is a side view of a reel mower cutting unit showing an alternative embodiment of the present invention.

FIGS. 1–4 illustrate the preferred embodiment of the present invention. However, alterations to the design shown in those Figures also fall within the spirit of the present invention as claimed. For example, the washer 56 and sleeve 70 shown in the drawings are separate parts, but could also be provided as a single integral part. Another alternative embodiment 74 is shown in FIG. 5 which includes a collar 76 that could be provided in place of the double legged bracket 44 as shown in FIGS. 1–4. The alternative embodiment 74 provides an extended collar 76 having a central opening 78 through which the rod 32 is positioned. The collar 76 is not fixed with the cutting unit frame 22. The collar 76 includes arms 80 that extend from the main body portion 82 of the collar 76 and into abutment with a first brace member 84 that is fixed with the cutting unit frame 22. During mowing operations the compression spring 54 presses the collar 76 upwardly along the rod 32 such that the arms 80 abut the first brace 84. The compression spring 54 removes play and gaps from the linkage 74 at the connection mechanisms at both the lower and upper ends of the rod 32. The nut 64 threaded on the rod 32 can be positioned in abutment with the shoulder portion 66 of the adjustment member 50 to help secure the adjustment member 50 in the selected position on the rod 32. To swing the linkage 74 to the service position, the operator tightens the nut 64 downwardly along the rod 32 until the nut 64 abuts the main body portion 82 of the collar 76. As the operator continues to tighten the nut 64, the main body 82 of the collar 76 will shift downwardly therewith to compress the spring 54 further, and the arms 80 will shift downwardly with the main body 82 out of abutment with the first brace member 84. The force from the compression spring 54 is thereby removed from the first brace 84 and adjustment member 50. The operator can then loosen the adjustment member 50 upwardly on the rod 32 until the shoulder portion 66 shifts out from within the first brace 84. The rod 32 can then be pivoted through the narrow portion 72 of the slot 40 in the first brace 84, and the operator can swing the linkage 74 counterclockwise to the service position.

The present invention therefore provides a bedknife adjustment mechanism that allows an operator to quickly and easily adjust the position of the bedknife 20 with respect to the reel blades 16. The selected bedknife position is maintained even after the adjustment member 50 is locked in place by the nut 64 being tightened upwardly against the shoulder portion 66. The present invention also provides a mechanism which includes a compression spring 54 for removing any slack from the linkage at both the top and bottom portions of the rod 32. A mechanism is provided for removing the force of the compression spring 54 from the adjustment member 50 so that the linkage can be easily swung to a maintenance position that allows the bedknife 20 to be serviced or replaced, or other maintenance to be performed. The linkage 24 does not allow the cutting edge 30 of the bedknife 20 to shift upwardly into the reel mower blades 16 when the bedknife 20 strikes an obstruction during mowing operations. Furthermore, the nut 64 according to the present invention can be tightded down on the rod 32 to compress the spring during the assembly process, which allows the linkage according to the present invention to be manufactured relatively easily and without requiring the assembler to use other tools for compressing the spring during assembly.

I claim:

1. A bedknife adjustment linkage for a cutting unit having a frame, reel and bedknife, comprising:

a shiftable support that supports the bedknife and is shiftably coupled with the cutting unit, an elongate member coupled with the support by way of a connection device, an adjustment member coupled with the elongate member in operative abutment with a first brace coupled with the cutting unit frame, said adjustment member being shiftable along the elongate member for adjusting the position of the elongate member relative to the cutting unit frame to thereby adjust the position of the bed knife;

a compression spring operatively engaged between the support and the first brace bracket, the compression spring being positioned to bias a cutting edge of the bedknife in a direction toward the reel, and a force applied to the linkage by the compression spring operatively eliminates play that may be present in the connection device and between the adjustment member, elongate member and first brace, wherein the elongate member is a threaded rod and the adjustment member includes a threaded opening within which is received the elongate member, the adjustment member being rotatable for adjusting the position of the threaded rod with respect to the first brace to thereby adjust the position of the bedknife, and a nut within which the threaded rod is positioned, said nut being rotatable for shifting into operative abutment with the compression spring for further compressing the compression spring to such an extent that the compression spring operatively disengages the first brace and ceases to operatively apply force to the first brace.

2. The invention of claim 1, and further comprising:

a second brace operatively coupled with the first brace, the second brace being spaced from the first brace, and the compression spring applies a force to the second brace which is then transmitted to the first brace by the second brace's operative connection to the first brace to thereby remove any play from between the threaded rod, adjustment member and first brace.

3. The invention of claim 2, wherein the nut is positioned between the first and second braces.

4. The invention of claim 3, and further comprising:

a sleeve through which the elongate member is received, the sleeve being positioned so that the nut is adjustable to operatively press the sleeve against the compression spring for further compressing the compression spring such that the compression spring ceases applying force to the second brace.

5. The invention of claim 4, and further comprising:

a spacer positioned between the nut and the adjustment member, the nut being rotatable to shift into abutment with the spacer for securing the adjustment member in a selected position, said spacer being larger than the first brace for thereby blocking the nut from abutting the first brace when the nut is in abutment with the adjustment member.

6. The invention of claim 5, and further comprising:

a double legged bracket having a first leg defined by the first brace and a second leg defined by the second brace.

7. The invention of claim 6, wherein both the first and second legs are rigidly fixed with the cutting unit frame.

8. The invention of claim 6, wherein the first and second legs are rigidly fixed with respect to each other by way of the double legged bracket.

9. The invention of claim 6, wherein the first and second legs are rigidly fixed with respect to each other by the double legged bracket and by being both rigidly fixed with the cutting unit frame.

10. The invention of claim 6, wherein:

slots formed in the first and second braces receive the elongate member and allow the elongate member to swing away from the first and second braces about an axis defined by the connection device when the nut operatively compresses the compression spring.

11. The invention of claim 10, wherein:

one of the slots includes a narrowed portion that blocks the elongate member from shifting through the slot before hardware in the elongate slot is shifted out of alignment with the narrowed portion.

12. The invention of claim 11, wherein:

the narrowed portion is formed in the first brace, and the spacer defines the hardware that must shift out of alignment with the narrowed portion to allow the elongate member to shift through the slot.

13. The invention of claim 1, and further comprising:

a spacer positioned between the nut and the adjustment member, the nut being rotatable to shift into abutment with the spacer for securing the adjustment member in a selected position, said spacer being larger than the first brace for thereby blocking the nut from abutting the first brace when the nut is in abutment with the adjustment member.

14. The invention of claim 2, and further comprising:

a double legged bracket having a first leg defined by the first brace and a second leg defined by the second brace.

15. The invention of claim 14, wherein both the first and second legs are rigidly fixed with the cutting unit frame.

16. The invention of claim 14, wherein the first and second legs are rigidly fixed with respect to each other by way of the double legged bracket.

17. The invention of claim 2, wherein:

slots formed in the first and second braces receive the elongate member and allow the elongate member to swing away from the first and second braces about an axis defined by the connection device when the nut operatively compresses the compression spring.

18. The invention of claim 17, wherein:

one of the slots includes a narrowed portion that blocks the elongate member from shifting through the slot before hardware on the elongate slot is shifted out of alignment with the narrowed portion.

19. The invention of claim 18, wherein:

the narrowed portion is formed in the first brace, and the spacer defines the hardware that must shift out of alignment with the narrowed portion to allow the elongate member to shift through the slot.

20. The invention of claim 1, and further comprising:

a spacer positioned between the nut and the adjustment member, the nut being rotatable to shift into abutment with the spacer for securing the adjustment member in a selected position, said spacer being larger than the first brace for thereby blocking the nut from abutting the first brace when the nut is in abutment with the adjustment member.

21. The invention of claim 1, and further comprising:

a sleeve through which the elongate member is received, the sleeve being positioned so that the nut is adjustable to operatively press the sleeve against the compression spring for further compressing the compression spring such that the compression spring ceases applying force to the second brace.

\* \* \* \* \*

UNITED STATES PATENT AND TRADEMARK OFFICE
CERTIFICATE OF CORRECTION

PATENT NO. : 6,044,637
DATED : 4 April 2000
INVENTOR(S) : Richard David Thier et al.

It is certified that error appears in the above-identified patent and that said Letters Patent is hereby corrected as shown below:

Column 6, line 67, delete "brace".

Signed and Sealed this

Tenth Day of April, 2001

Attest:

NICHOLAS P. GODICI

Attesting Officer     Acting Director of the United States Patent and Trademark Office